(12) United States Patent
Kuo et al.

(10) Patent No.: US 7,707,635 B1
(45) Date of Patent: Apr. 27, 2010

(54) SCRIPT-BASED PATTERN FOR DETECTING COMPUTER VIRUSES

(75) Inventors: Kuo-Sheng Kuo, Taipei (TW); Tung-Yin Chiang, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 1238 days.

(21) Appl. No.: 11/244,759

(22) Filed: Oct. 6, 2005

(51) Int. Cl.
*G06F 11/00* (2006.01)
*G06F 12/14* (2006.01)
*G06F 12/16* (2006.01)
*G06B 23/00* (2006.01)

(52) U.S. Cl. ............................ 726/24; 726/22; 726/23
(58) Field of Classification Search ................ 713/187, 713/188; 726/22–25
See application file for complete search history.

(56) References Cited

U.S. PATENT DOCUMENTS

| | | | |
|---|---|---|---|
| 6,016,546 A | 1/2000 | Kephart et al. | |
| 6,886,099 B1 | 4/2005 | Smithson et al. | |
| 6,934,857 B1 | 8/2005 | Bartleson et al. | |
| 7,398,553 B1* | 7/2008 | Li | 726/22 |
| 2002/0073330 A1* | 6/2002 | Chandnani et al. | 713/200 |
| 2003/0009690 A1* | 1/2003 | Grupe | 713/201 |
| 2005/0177736 A1* | 8/2005 | de los Santos et al. | 713/188 |
| 2006/0021039 A1* | 1/2006 | Grupe | 726/22 |

* cited by examiner

*Primary Examiner*—Michael Pyzocha
*Assistant Examiner*—Jing Sims
(74) *Attorney, Agent, or Firm*—Okamoto & Benedicto LLP

(57) ABSTRACT

In one embodiment, script patterns for identifying particular network viruses are written using a scripting language. The scripting language may allow for flow control, arithmetic, memory manipulation, and content matching operations, for example. Each script pattern may identify a particular network virus using a set of instructions supported by the scripting language. Among other advantages, the use of script patterns allows antivirus analysts to develop more flexible and effective patterns for dealing with current and future network threats.

20 Claims, 4 Drawing Sheets

SCRIPT-BASED PATTERN FOR DETECTING COMPUTER VIRUSES

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

The present invention relates generally to computer systems, and more particularly but not exclusively to detection of computer viruses.

2. Description of the Background Art

As is well known, antivirus software may be employed to protect a computer network from computer viruses. A typical antivirus software includes a scanning engine and a pattern file, which includes patterns (also referred to as "signatures") of known viruses. Each pattern in the pattern file identifies a particular virus. The scanning engine compares the patterns against files or other units of data being checked to determine if they include one or more viruses. The pattern file is continually updated to keep up with virus coders. Antivirus software vendors, like Trend Micro, Inc., employ a team of antivirus analysts to monitor for new viruses and develop a pattern for each newly discovered virus.

A network virus is a form of malicious code that attacks a computer network. Unlike file-based viruses, a network virus is detected at the network layer, i.e. by scanning packets of the network traffic. Conventional patterns for detecting network viruses are typically written using regular expressions. A regular expression allows for simple string matching techniques to detect viruses in network traffic. A typical regular expression is a single line of character and string matching operators. Due to their nature, regular expressions do not allow for parsing of data structure of network data stored in a buffer. For example, a typical pattern written using regular expressions only allows for byte by byte scanning of a data stream. Because the complexity and destructive potential of viruses continue to increase, what is needed is an improved technique for identifying particular viruses.

SUMMARY

In one embodiment, script patterns for identifying particular network viruses are written using a scripting language. The scripting language may allow for flow control, arithmetic, memory manipulation, and content matching operations, for example. Each script pattern may identify a particular network virus using a set of instructions supported by the scripting language. Among other advantages, the use of script patterns allows antivirus analysts to develop more flexible and effective patterns for dealing with current and future network threats.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that the components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may then be executed by a processor. Components may be implemented separately in multiple modules or together in a single module.

Computer viruses, worms, Trojans, and spyware are examples of malicious codes that have plagued computer systems throughout the world. Although there are technical differences between each type of malicious code, malicious codes are collectively referred to herein as "viruses." For example, commercially available antivirus software is designed to scan a computer for viruses as well as worms and other malicious codes.

Figure 1:
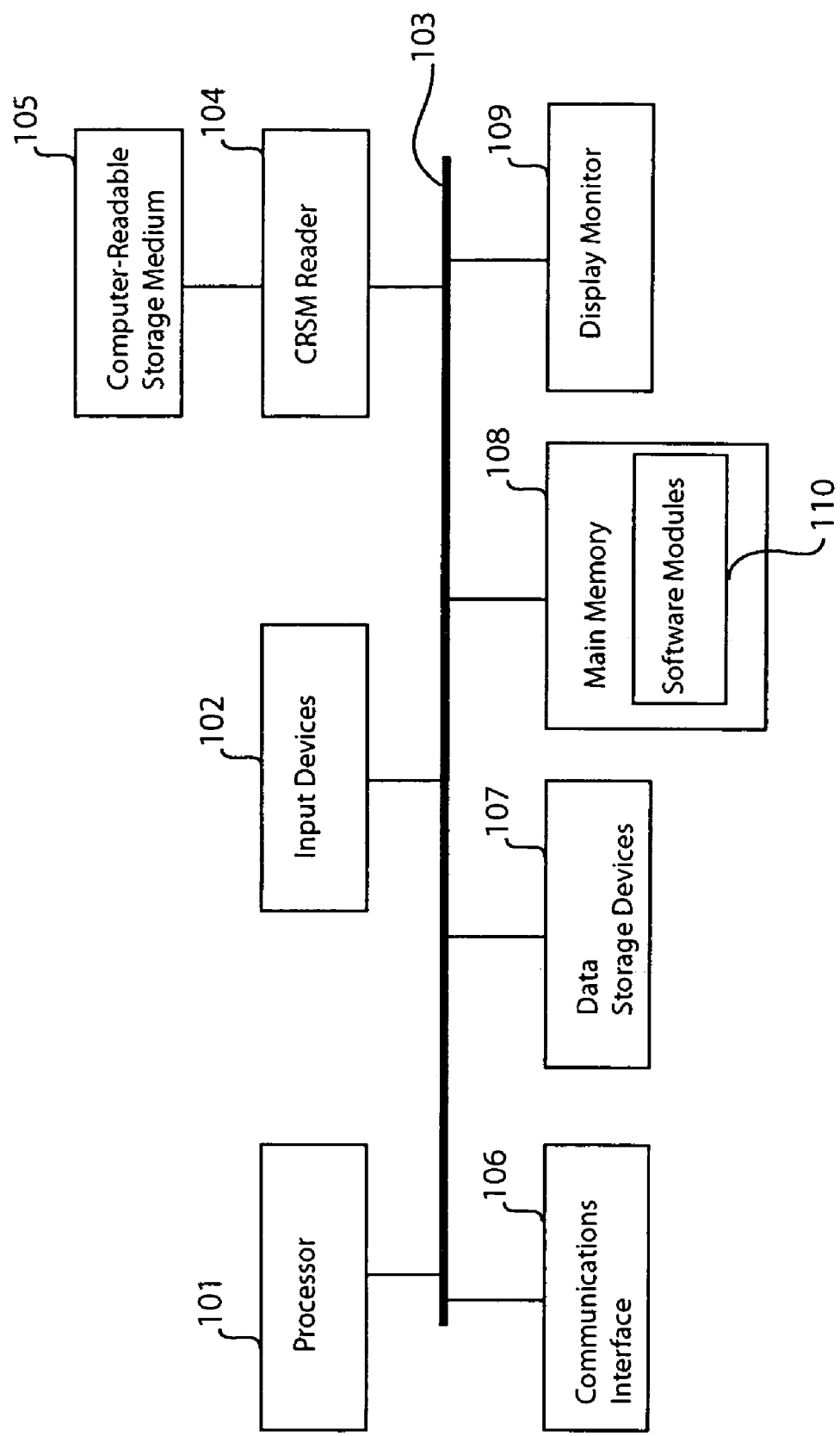
FIG. 1 shows a schematic diagram of an example computer that may be used in embodiments of the present invention.

Referring now to FIG. 1, there is shown a schematic diagram of an example computer that may be used in embodiments of the present invention. The computer shown in the example of FIG. 1 may be employed as a server computer or an appliance for detecting network viruses, for example. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., cathode ray tube, flat panel display), a communications interface 106 (e.g., network adapter, modem) for coupling to a computer network, one or more data storage devices 107 (e.g., hard disk drive, optical drive, FLASH memory), and a main memory 108 (e.g., RAM). Software embodiments may be stored in a computer-readable storage medium 105 for reading into a data storage device 107 or main memory 108. Software embodiments may also be received over a computer network by way of communications interface 106. In the example of FIG. 1, main memory 108 includes software modules 110, which may comprise software components described in FIGS. 2 and 3. The software modules 110 may be executed by processor 101.

Figure 2:
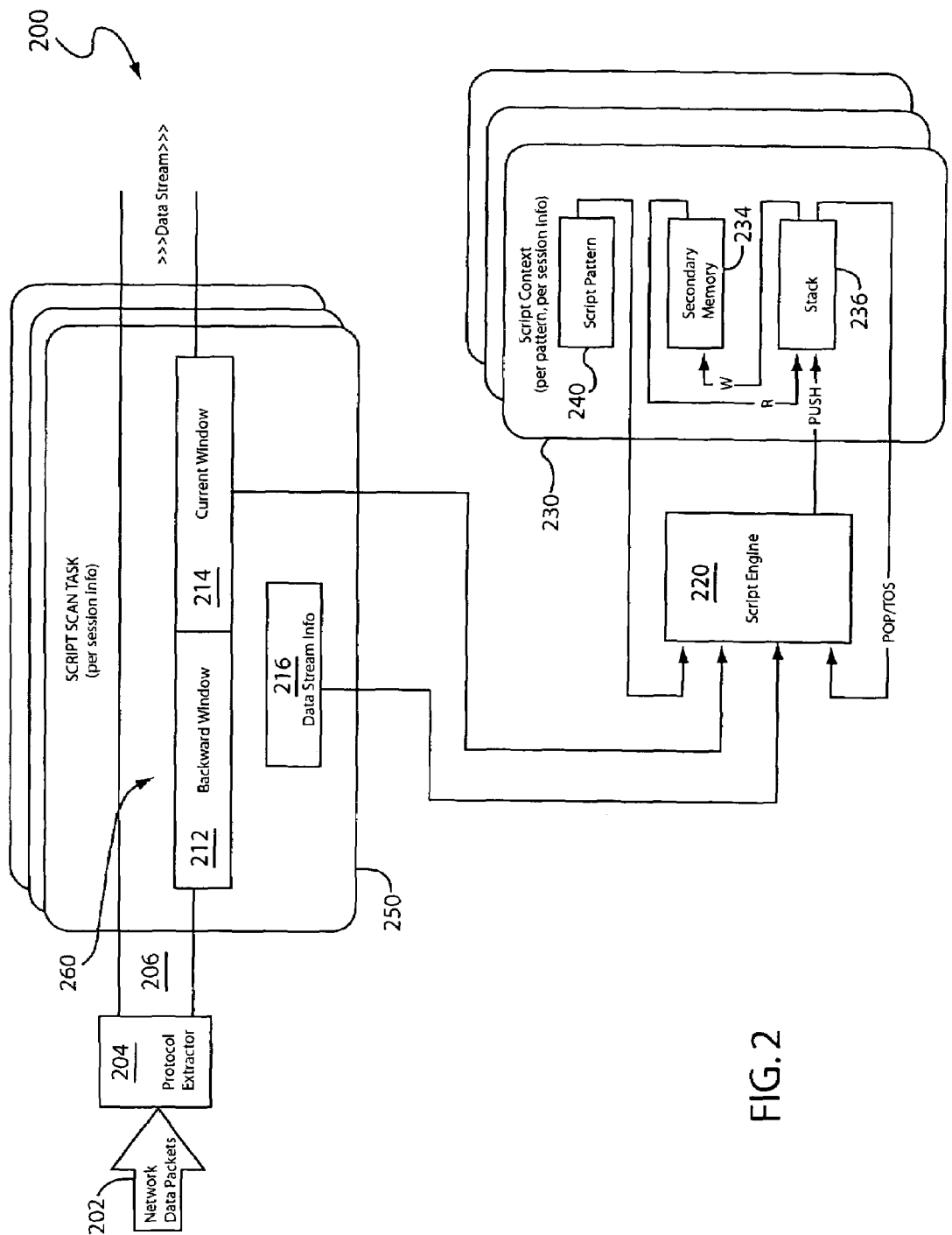
FIG. 2 schematically illustrates a network virus scanning system in accordance with an embodiment of the present invention.

FIG. 2 schematically illustrates a network virus scanning system 200 in accordance with an embodiment of the present invention. The virus scanning system 200 may be configured to detect network viruses. In one embodiment, system 200 scans network data packets for network viruses at layer 4 of the Open System Interconnection (OSI) protocol stack.

In the example of FIG. 2, the system 200 includes a protocol extractor 204, a script engine 220, one or more script patterns 240, a secondary memory 234, a stack 236, and a buffer memory 260 storing a backward window 212, a current window 214, and a data stream information 216. In one embodiment, the aforementioned components of the system 200 are implemented in a server computer for scanning data for viruses before forwarding the data to client computers or other server computers. This advantageously allows for a centralized location where virus scanning may be performed.

As shown in FIG. 2, the protocol extractor 204 receives network data packets 202 over a computer network. Network data packets 202 may be received in the server computer by way of a communications interface (e.g. communications interface 106 of FIG. 1) coupled to the computer network. The protocol extractor 204 may comprise computer-readable program code for parsing the protocol of the network data packets 202 and then extracting their payloads. The payloads of the network data packets 202 may be provided to the script engine 220 as a data stream 206. In the example of FIG. 2, portions of the data stream 206 are stored in the buffer 260 for virus scanning purposes.

The virus scanning system 200 allows for incremental scanning. Portions of the data stream 206 currently available for virus scanning (i.e. currently visible chunk of the data stream) are referred to as current window 214, while portions of the data stream 206 previously scanned for viruses are referred to as backward window 212. The backward window 212 serves as a backward reference buffer and allows script operators to reference portions of the data stream 206 that are not in the current window 214. The data stream information 216 comprises additional information about the payloads including destination and source port numbers, IP addresses, etc.

The stack 236 allows for stack operations, such as PUSH and POP operations. In one embodiment, the stack 236 comprises memory having a depth of 256 and a width of 32 bits. The stack 236 allows the script engine 220 to PUSH and POP data into and out of the stack when executing instructions included in a script pattern 240. For example, the script engine 220 may employ the stack 236 to execute script instructions involving arithmetic operations.

The secondary memory 234 provides additional memory space besides the stack 236. In one embodiment, the secondary memory 234 has the same depth and width as the stack 236. A write operation ("W" in FIG. 2) allows copying of data from the stack 236 to the secondary memory 234. Similarly, a read operation ("R" in FIG. 2) copies data from the secondary memory 234 to the stack 236. The secondary memory 234 and the stack 236 may be implemented in main memory, such as main memory 108 of FIG. 1, or in separate random access memory (RAM) or other storage unit.

In one embodiment, a script pattern 240 comprises a set of instructions for identifying a particular (i.e. specific) virus. Because a script pattern 240 is written for a particular virus, the virus scan system 200 may employ several script patterns 240 to guard against multiple viruses. That is, a first script pattern may be written to identify a first network virus, a second script pattern may be written to identify a second network virus, and so on. Depending on implementation, a script pattern 240 may also be adapted to identify more than one virus. For example, a single script pattern 240 may identify two viruses. Script patterns 240 may be distributed as pattern files of the script engine 220. An antivirus analyst may create a script pattern 240 for a newly discovered virus and then distribute that script pattern in a pattern file.

In one embodiment, a script pattern 240 is written using a scripting language. After a script pattern 240 is written by the antivirus analyst, the script pattern 240 may be compiled (i.e. converted to machine language) prior to being executed by the script engine 220. The script engine 220 may also be implemented as an interpreter so that the script pattern 240 does not have to be compiled (i.e. left in source code form) prior to being provided to the script engine 220. It is to be noted that the mechanics of compiling and interpreting source codes, in general, is known in the art and not further discussed here.

In one embodiment, the scripting language allows for content matching, memory manipulation, arithmetic, flow control, and information operations in a script pattern 240. The content matching operators may allow for matching of a string of characters (e.g. alpha-numeric characters) with data in the current window 214. The content matching operators allow for identification of network viruses by comparing for telltale characters indicative of a virus. In one embodiment, content matching operation is performed by first pointing to a location in the buffer 260 using an offset and a specifying range of locations from that offset. Portions of the data stream in the specified location are then compared to predetermined characters using content matching operators. The scripting language may include content matching operators for terminating execution of the script pattern 240 if no match is found and for branching to another instruction or moving to the next instruction in the script pattern when a match is found.

The memory manipulation operators may allow for writing and reading of data to and from the secondary memory 234 and the stack 236. In one embodiment, a PUSH operation stores data to the top of the stack 236, a POP operation moves data from the top of the stack 236 for reading by the script engine 220, a write operation moves data from the stack 236 to the secondary memory 234, and a read operation moves data from the secondary memory 234 to the stack 236. Movement of data from one stack location to another may also be performed for arithmetic operations (e.g. adding the values of the top two stack locations to get a result on the top of the stack).

The arithmetic operators may allow for addition, subtraction, multiplication, division, shifting, rotation, and logical operations (logical AND, logical OR, logical XOR, . . . ) of data, for example. In one embodiment, the arithmetic operations are performed over the stack 236. For example, addends may be pushed to the top two locations of the stack 236 before determining their sum using an add operation. The sum, which is stored on the top of the stack 236, may be popped out for reading.

The flow control operators may allow for changing of the script flow. In one embodiment, the flow control operators allow for conditional or absolute branching to specified lines in the script pattern. For example, a conditional flow control operator may allow for conditional branching to skip the next (i.e. following) instruction. The conditional flow control operators may include jump if less than ("jl"), jump if less than or equal ("jle"), jump if greater than ("jg"), jump if greater than or equal ("jge"), jump if equal ("je"), and jump if not equal ("jne"). The absolute flow control operators may include a "goto".

The information operators allow for receiving information relating to the script engine 220 and the data stream 206. In one embodiment, the information operators allow for determining the version number of the script engine 220 ("GetEngineVersion"), the destination IP address of the payload ("GetDstIP"), the destination port address of the payload ("GetDstPort"), the source IP address of the payload ("GetSrcIP"), and the source port address of the payload ("GetSrcPort").

Table 1 below shows an example script pattern 240 written using the aforementioned scripting language. Note that the syntax and format of a scripting language may vary from that shown in Table 1 depending on implementation. Table 1 is provided below for illustration purposes and not as a limitation. Further note that the scripting language may also allow for the use of operators available in other scripting or programming languages without detracting from the merits of the present invention.

TABLE 1

```
sample_virus {      ;   virus name is "sample_virus"
    format="TCP"    ; apply to TCP stream
    dst_port=1894       ; TCP destination port
    offset=0 "MYIM"     ; check protocol magic signature at
                          offset 0
    push_DWORD          ; protocol version
    jl(40,_exit)        ; version >= 40
    jg(50,_exit)        ; version <= 50
    push_DWORD          ; 1st section offset from protocol header
    push_DWORD push(4) *  ; 1st section size in DWORD from
                          protocol header
    +                   ; x: 2nd section offset calculated from
                          1st section offset + size
    push_DWORD          ;  y: 2nd section offset from protocol
                          header
    – je(0,_exit)       ;  if x!=y, it's network attack
    virus_found
:_exit
    not_virus
}
```

In the example of Table 1, the script pattern 240 is for data streams conforming to the TCP protocol and going to a destination port number "1894". Before scanning a buffered portion of the data stream 206 for a particular network virus, the script pattern 240 checks the version number of the application protocol over TCP protocol, and conditionally branches to the "_exit" line if the version number is less than or equal to 40 or greater than or equal to 50. After the protocol version is verified for compatibility, the script pattern 240 pushes portions of the current window 214 into the stack 236 for comparison by subtraction. If there is a match (i.e. the difference is zero), the virus found routine is executed to indicate the presence of a virus. Otherwise, the script jumps to "_exit" line to indicate that the virus is not found.

In the example of FIG. 2, the script engine 220 may comprise computer-readable program code for executing the set of instructions in a script pattern 240. The script engine 220 may employ an instruction pointer to sequence through the lines of instructions in a script pattern 240. The script engine 220 may access portions of the buffer 260 in executing a script pattern 240 to check the data stream 206 for network viruses.

In one embodiment, the network virus scanning system 200 scans for network viruses on a per communication session basis. In the case of network data packets conforming to the TCP protocol, each TCP session is run as a single script scan task 250. For example, if there are 10 open TCP sessions, there will be 10 scan tasks 250, one for each session. Also, each script pattern 240, per communication session may be run in a separate script context 230. For example, a scan task 250 for a particular TCP session may be running in conjunction with several script contexts 230 (one for each script pattern 240) to protect the network communication in that session from viruses identified by the script patterns 240. To allow for incremental scanning of the data stream 206, context switching may be performed to switch to the appropriate scan task 250 and between script contexts 230 in the same scan task.

Figure 3:
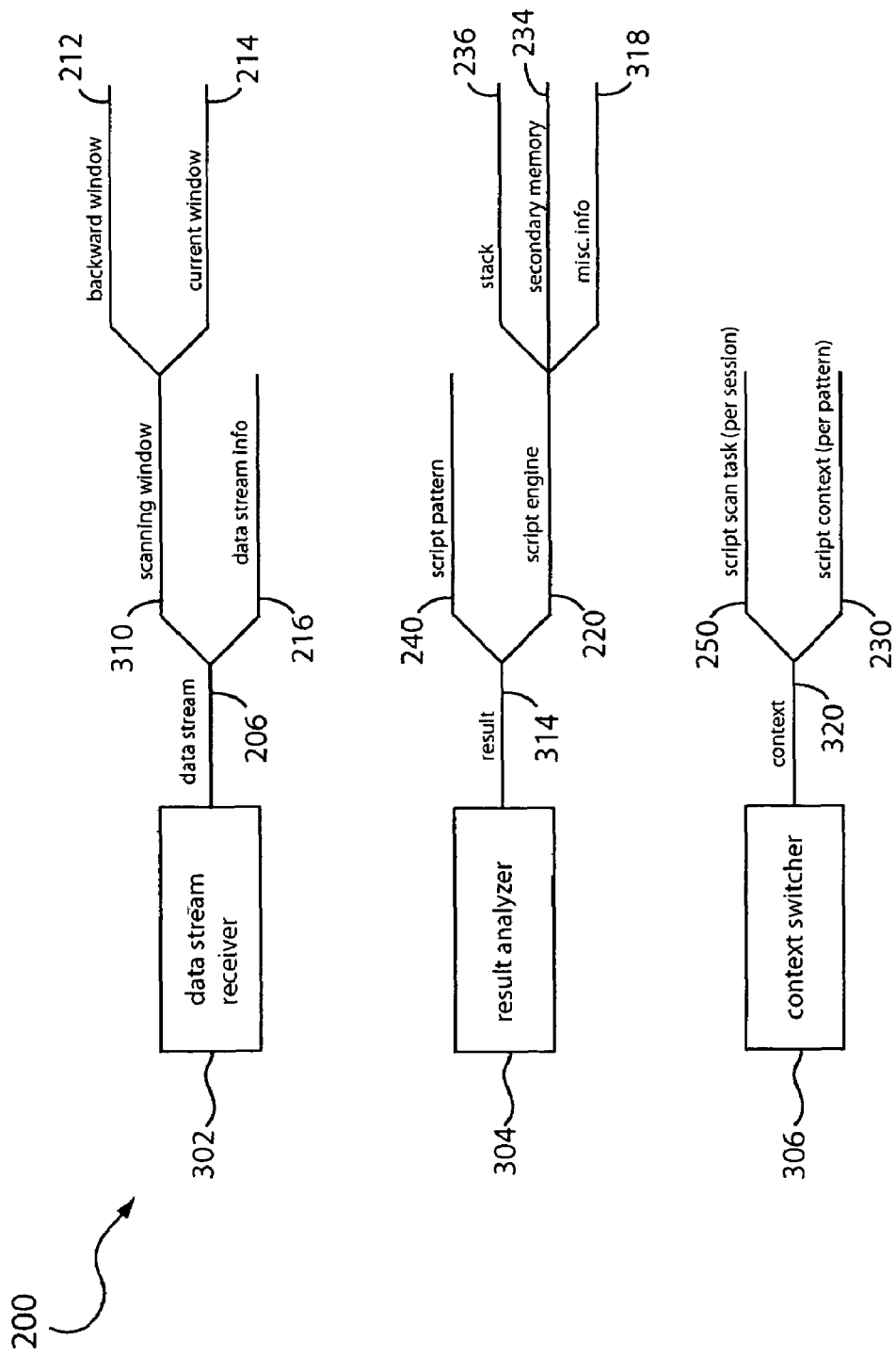
FIG. 3 shows the network virus scanning system of FIG. 2 in hierarchical form.

FIG. 3 shows the network virus scanning system 200 in hierarchical form. In the example of FIG. 3, a data stream receiver 302 may be a portion or module of the script engine 220 that allows for reception of a portion of the data stream 206. The data stream 206 includes data in a scanning window 310 and the data stream information 216. The scanning window 310 may comprise the backward window 212 and the current window 214.

A result analyzer 304 may comprise computer-readable program code for analyzing the result of the virus scanning. In one embodiment, the result analyzer 304 may be configured to perform a predetermined action or series of actions when a network virus is detected. For example, the result analyzer 304 may be configured to terminate a communication session, block the source and destination IP addresses and ports of the communication session, raise an alarm, etc. when a network virus is detected in the traffic of the communication session. The actions performed by the result analyzer 304 may be based on the result 314, which is the result of using the script engine 220 to execute a script pattern 240 to detect for network viruses. As previously discussed, the script engine 220 may employ the stack 236, the secondary memory 234, and other information in scanning for network viruses.

A context switcher 306 may comprise computer-readable program code for performing context switching to select a context 320, which may be a script scan task 250 or a script context 230. Services for context switching may be provided by the operating system or the script engine, for example.

Figure 4:
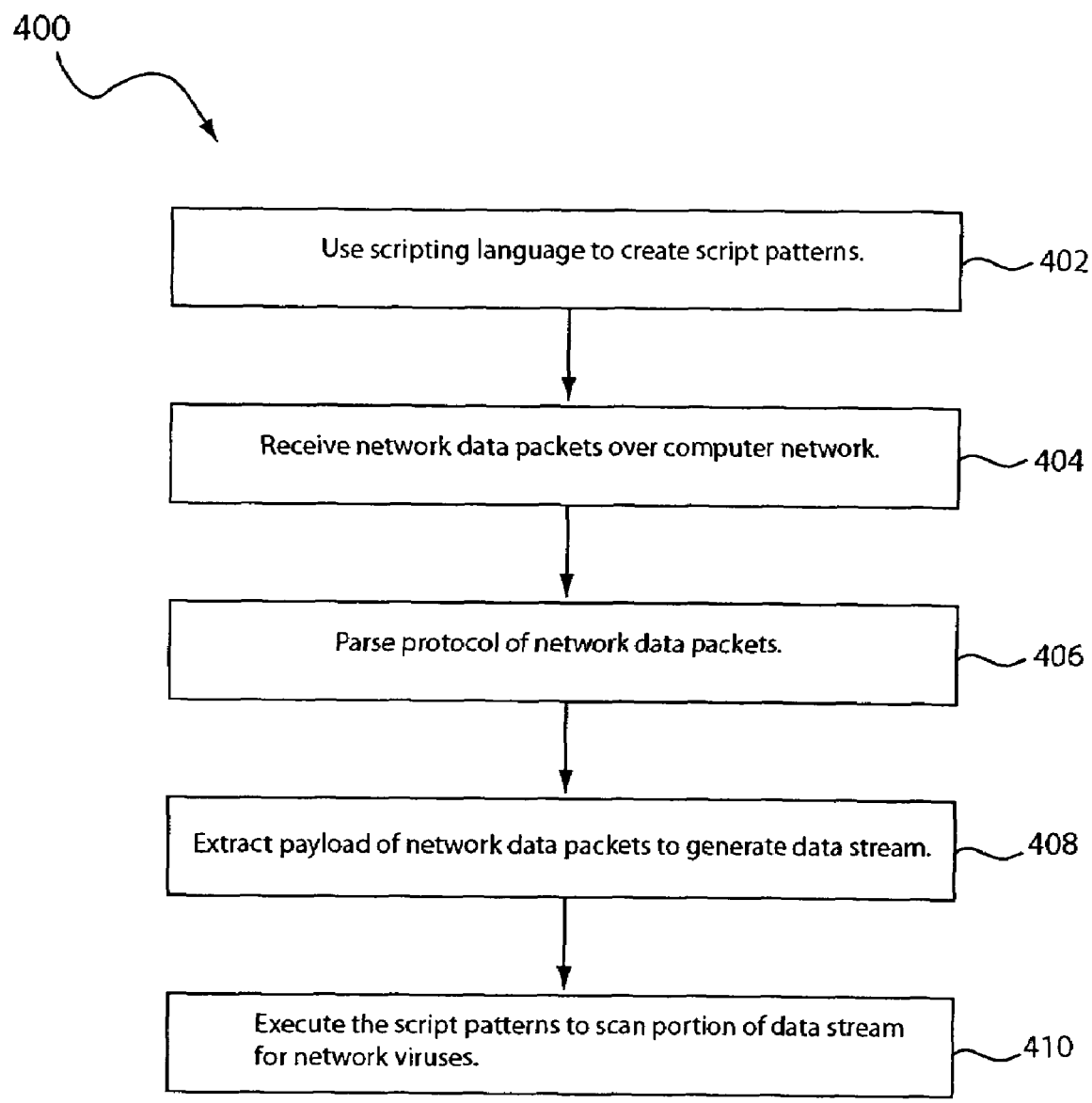
FIG. 4 shows a flow diagram of a method 400 of scanning network traffic for network viruses in accordance with an embodiment of the present invention.

FIG. 4 shows a flow diagram of a method 400 of scanning network traffic for network viruses in accordance with an embodiment of the present invention. The method 400 may be performed using the components shown in FIGS. 2 and 3. Other components may also be employed to implement the method 400 without detracting from the merits of the present invention.

In step 402, a scripting language is used to create scripting patterns. The scripting language may allow for the use of content matching, memory manipulation, conditional and absolute flow control, and information operators in a script pattern to identify a particular network virus. The scripting language may be used by an antivirus analyst to create several script patterns, one for each particular virus, for example. Each script pattern may comprise a set of instructions for identifying a particular virus.

In step 404, network data packets are received over a network. The network data packets may conform to a communication protocol, such as TCP, IP, ICMP, and UDP, for example.

In step 406, the protocol of the network data packets is parsed, using a protocol extractor, for example. The protocol of the network data packets may be parsed by checking the header of the data packets.

In step 408, the payloads of the network data packets are extracted. The extracted payloads may be provided to a scripting engine as a data stream.

In step 410, the script patterns created using the scripting language are executed to scan portions of the data stream for network viruses. For example, portions of the data stream currently available for scanning may be stored in a buffer. The scanning engine may execute the instructions included in a script pattern to check the contents of the buffer for network viruses.

Improved techniques for scanning network traffic for viruses have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of scanning computer network traffic for viruses, the method comprising:
    providing a scripting language for creating script patterns that identify network viruses, the scripting language allowing for the use of conditional flow control in a script pattern to identify a particular network virus;
    creating a first script pattern using the scripting language, the first script pattern comprising a first set of instructions for identifying a first particular network virus;
    creating a second script pattern using the scripting language, the second script pattern comprising a second set instructions for identifying a second particular network virus, the first and second set of instructions including at least one instruction for conditional branching to skip a next instruction;
    generating a data stream from network data packets received over a computer network; and
    scanning a portion of the data stream for existence of the first particular network virus by executing the first script pattern and for existence of the second particular network virus by executing the second script pattern.

2. The method of claim 1 wherein the scripting language allows for the use of arithmetic and memory manipulation operations in a script pattern to identify a particular network virus.

3. The method of claim 1 wherein generating the data stream comprises:
    parsing a protocol of the network data packets; and
    obtaining payloads of the network data packets.

4. The method of claim 3 wherein the protocol comprises Transmission Control Protocol (TCP), and scanning the portion of the data stream is performed for a particular TCP session on the computer network.

5. The method of claim 1 wherein scanning the portion of the data stream comprises:
    providing the first script pattern and the second script pattern to a script engine; and
    using the script engine to execute the first script pattern and the second script pattern.

6. The method of claim 1 wherein the portion of the data stream comprises data at layer 4 of the Open System Interconnection (OSI) protocol stack.

7. The method of claim 1 wherein the data stream is stored in a buffer having a current window comprising portions of the data stream currently available for scanning and a backward window comprising portions of the data stream that have been scanned.

8. The method of claim 1 wherein the first script pattern and the second script pattern are created to detect viruses in network data packets conforming to a particular communication protocol.

9. A system for scanning computer network traffic for viruses, the system comprising:
    a buffer configured to store portions of a data stream;
    a plurality of script patterns, each script pattern in the plurality of script patterns comprising a set of instructions for identifying a particular network virus, each script pattern in the plurality of script patterns being created using a scripting language that allows for conditional flow control to allow conditional branching to a line of a script pattern; and
    a script engine configured to execute the script patterns to check the data stream for network viruses.

10. The system of claim 9 wherein each script pattern in the plurality of script patterns is for a particular communication protocol.

11. The system of claim 9 wherein the portions of the data stream stored in the buffer include a portion available for scanning and a portion that has already been scanned.

12. The system of claim 9 wherein the scripting language allows for arithmetic operations and memory manipulation operations in a script pattern.

13. The system of claim 9 further comprising a stack over which the scripting engine executes arithmetic operations included in a script pattern in the plurality of script patterns.

14. The system of claim 13 further comprising secondary memory configured to forward and receive data to and from the stack.

15. A method of scanning computer network traffic for viruses, the method comprising:
    parsing a protocol of network data packets received over a network;
    extracting payloads of the network data packets;
    storing the payloads as data stream in a buffer;
    scanning portions of the data stream in the buffer for network viruses using a plurality of script patterns, each script pattern in the plurality of script patterns comprising a set of instructions for identifying a network virus, at least a first script pattern in the plurality of script patterns including an instruction for allowing conditional branching to a line of the first script pattern.

16. The method of claim 15 wherein at least a second script pattern in the plurality of script patterns includes an instruction for allowing an arithmetic operation over a stack.

17. The method of claim 15 wherein the first script pattern is configured to identify a network virus in data packets conforming to a particular communication protocol.

18. The method of claim 15 wherein the first script pattern includes an instruction for storing and retrieving data from a stack.

19. The method of claim 15 wherein the plurality of script patterns are executed by a scripting engine.

20. The method of claim 19 wherein the plurality of script patterns are executed in separate contexts.

* * * * *